No. 657,285. Patented Sept. 4, 1900.
W. H. HANSELL.
EGG CASE FILLER.
(Application filed June 21, 1900.)
(No Model.)
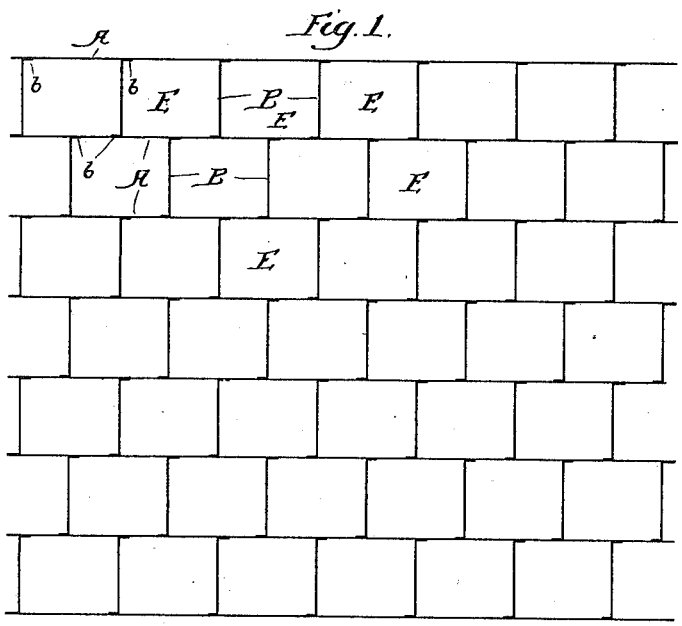
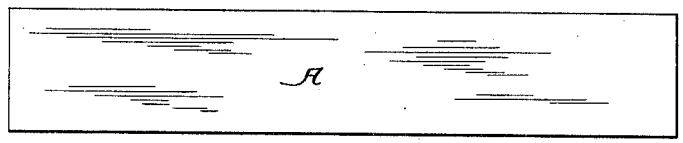
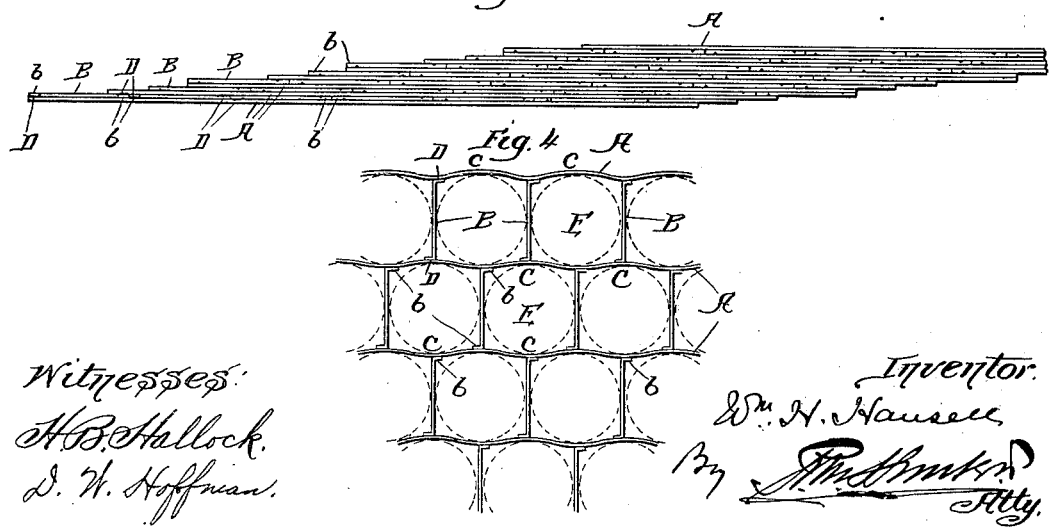

UNITED STATES PATENT OFFICE.

WILLIAM HENRY HANSELL, OF PHILADELPHIA, PENNSYLVANIA.

EGG-CASE FILLER.

SPECIFICATION forming part of Letters Patent No. 657,285, dated September 4, 1900.

Application filed June 21, 1900. Serial No. 21,029. (No model.)

*To all whom it may concern:*

Be it known that I, WILLIAM HENRY HANSELL, of Philadelphia, county of Philadelphia, and State of Pennsylvania, have invented an Improvement in Egg-Case Fillers, of which the following is a specification.

My invention has reference to egg-case fillers; and it consists of certain improvements, which are fully set forth in the following specification and shown in the accompanying drawings, which form a part thereof.

Heretofore it has been customary to construct egg-case fillers of a series of strips of cardboard having transverse slits, said strips being interlocked, so that when the filler is extended into a substantial square it presents a series of square chambers, into which the eggs are placed. When the eggs are removed, it is adapted to be collapsed diagonally, so as to take up a considerably-smaller space for return shipment and for transportation generally to place where the eggs are to be packed. The objection to this construction of filler is that it is expensive to make in that it is so constructed that it must be assembled by hand. Furthermore, it is of weak construction in that each one of the strips is cut across its width at numerous places in its length, and the crate is therefore of one-half the strength which its width would otherwise have imparted. An additional objection is that the squares are uniformly disposed, so that there is a square directly on each side of another square, which construction brings the eggs in a position more liable to cause breakage.

My invention has for its object the construction of an egg-case filler which shall secure all of the advantages of the egg-case filler heretofore in use while eliminating to a large extent its defects. More specifically my object is to construct an egg-case filler of cardboard or similar material which shall be cheaply made in a condensed form and subsequently to be stretched out to form a substantially square or rectangular frame to produce a series of connected compartments of special shape into which the eggs may be placed and packed for shipment.

In carrying out my invention I construct the filler in the following manner: A series of flat strips of cardboard are separated by a series of transversely-divided strips of similar cardboard, said subdivided strips having their faces adjacent to the diagonal opposite edges glued or cemented or otherwise fastened to the faces of the continuous strips. When a number of layers are built up in this manner, in which the series of continuous strips have the interposed subdivided strips properly glued in place, the entire structure may be opened, and the subdivided strips will then present a series of transverse division-bars between the series of parallel continuous strips, forming a series of preferably forty-two connected rectangular compartments, the compartments of any two adjacent rows between parallel continuous strips being staggered or offset by the transverse divisions. Furthermore, it is preferable in this construction that the rectangular compartments be of greater length in one direction than the other, so that when the egg is forced into place it will slightly spread the middle portion of said compartment and cause the continuous strips to assume a more or less sinusoidal curve. The effect of this is that the eggs are more positively and firmly held irrespective of any slight differences in sizes and are more fully protected against lateral strains, which might be produced by turning the case on its side or excessive jarring.

My improvements will be better understood by reference to the drawings, in which—

Figure 1 is a plan view of an egg-case filler stretched out before the eggs are placed therein and embodying my invention. Fig. 2 is an elevation of same. Fig. 3 is a plan view of a portion of the said filler in a condensed form similar to that which it assumes in its process of manufacture; and Fig. 4 is an enlarged plan view of a portion of my improved filler, showing the eggs applied thereto.

A A are a series of continuous strips of cardboard or other suitable material arranged parallel to each other and of the same length. These various strips A are united at intervals by transverse division-strips B, which have their ends bent over and glued or otherwise fastened to the faces of any two adjacent strips A A. The series of transverse division-strips B between any two adjacent continuous strips A A when bent down parallel to the strips A A, as indicated in Fig. 3, will fit end to end, so that their total length is substantially equal to the total length of one of the strips A. These transverse division-pieces may therefore be considered as an interposed strip similar to A subdivided transversely into a series of separate short pieces B. In practice the said subdivided strip is furnished with paste upon its diagonal and opposite ends b, so that said opposite faces are respectively glued to the opposite adjacent faces of the two adjacent strips A A. When this is done, the said spacing-strips B will be attached at points D with the said continuous strips A. The separation of the strips A A will then cause the division-strips B to turn at right angles to the length of the strips A, as indicated in Fig. 1, and we shall have produced a filler having a series of longitudinal compartments E, adapted to receive the eggs, the said compartments E between any two of the continuous strips A A being staggered with regard to the similar compartments E between the next pair of adjacent strips A A, as will be clearly seen by reference to Fig. 1. It will also be observed that the length of these compartments E in the direction of the strips A is greater than the width or the distance between the strips A A, so that the total structure is not square until after the eggs are placed therein. When the eggs are inserted, as indicated in Fig. 4, it will be seen that the strips A A are made to take a more or less sinusoidal curve, since they are bulged out at points C C by the pressure of the eggs upon them, said points of curvature being in line with the transverse division-strips B. The eggs will therefore be located in staggered arrangement, which will materially protect them against breakage. The direct pressure of the cardboard upon the egg will be greater in the direction of the plane of the division-strips B and the curvature at parts C will tend to cause the eggs in adjacent compartment between any two parallel continuous strips A to be kept clear of great pressure on the division-strips B. In this manner the eggs are supported with the least tendency to directly crowd or hammer upon each other, and this provides a strong protection against accidental breakage in shipment. It will also be observed that as the eggs are in effect forced into the compartments E E and imparting to them an additional shape it follows that the said compartments will hold the eggs against loose play and will adapt themselves with spring action to suit eggs of different diameters.

In manufacturing these egg-case fillers on a large scale a series of continuous narrow strips properly pasted are interposed side by side between upper and lower continuous sheets of cardboard and an additional series of properly-pasted parallel strips arranged upon the upper surface of the upper of the continuous sheets of cardboard. Compound sheets so formed automatically in a suitable machine are cut off at a given length equal to the height of a number of the fillers, and a series of these strips are superimposed upon each other and pasted in proper position, so that the completed structure when cut up produces fillers of the character shown in the accompanying drawings. In this manner the expense of construction is reduced to a minimum and the accuracy of the parts is absolutely insured.

While I prefer the construction here shown, I do not limit myself to the minor details, as these may be modified without departing from the spirit of the invention.

Having now described my invention, what I claim as new, and desire to secure by Letters Patent, is—

1. In an egg-case filler, a series of parallel strips of cardboard or other pliable material connected together at intervals by a series of short spacing-strips attached to opposite faces of any two adjacent continuous strips, and in which the transverse connecting spacing-strips between one pair of parallel continuous strips is staggered with relation to the transverse spacing-strips between the next adjacent pair of continuous strips whereby a series of rectangular staggered compartments are secured.

2. In an egg-case filler, a series of parallel strips of cardboard or other pliable material connected together at intervals by a series of short spacing-strips attached to opposite faces of any two adjacent continuous strips, and in which the transverse connecting spacing-strips between one pair of parallel continuous strips is staggered with relation to the transverse spacing-strips between the next adjacent pair of continuous strips whereby a series of rectangular staggered compartments are secured, and in which the transverse connecting-strips are of less length than the distance between any two adjacent transverse strips in the same compartment, whereby the compartments are of greater length in one direction than the other.

3. In an egg-case filler, the combination of a series of parallel continuous strips of cardboard or other pliable material combined with a series of short hinged strips arranged end to end between each pair of adjacent longitudinal continuous strips and each of said hinged strips being attached on diagonally-opposite ends to the adjacent continuous strips and of such length including the spacing parts and pasted ends as to equal the distance between the adjacent spacing-strips when the filler is opened whereby the entire structure may be condensed to the greatest possible extent for packing in shipment and may be readily opened to form a series of rectangular compartments for receiving eggs.

4. An egg-case filler consisting of a series of parallel continuous strips of cardboard or other pliable material connected together at a width less than the diameter of the egg to be packed by a series of transverse spacing-strips, and in which the spacing-strips between one pair of continuous strips are staggered with relation to the similar spacing-strips between the next adjacent pair of continuous strips whereby the rectangular compartments in one row are staggered with the rectangular compartments in the next row and all of the compartments are equal in size.

5. In an egg-case filler, the combination of a series of parallel continuous strips having their surfaces uninterrupted by transverse incisions or cuts, combined with a series of spacing hinged division-strips arranged between the several continuous strips and those between any two continuous strips lying in the same plane when the filler is condensed for shipment whereby a series of compartments of greater length than width are formed between each pair of continuous strips when the filler is opened and the entire structure is so formed that its several continuous strips may be folded down by the independent action of the several series of hinged strips without any of said hinged strips overlapping.

In testimony of which invention I have hereunto set my hand.

WM. HENRY HANSELL.

Witnesses:
 R. M. HUNTER,
 R. M. KELLY.